United States Patent [19]

Arnaud

[11] Patent Number: 5,038,830
[45] Date of Patent: Aug. 13, 1991

[54] PIPE AND SEALING DEVICE

[75] Inventor: Johnny Arnaud, Houston, Tex.

[73] Assignee: Hydrotreat, Inc., Houston, Tex.

[21] Appl. No.: 235,700

[22] Filed: Aug. 19, 1988

Related U.S. Application Data

[63] Continuation of Ser. No. 879,519, Jun. 27, 1986, abandoned, which is a continuation of Ser. No. 734,822, May 16, 1985, abandoned, which is a continuation of Ser. No. 428,345, Sep. 29, 1982, abandoned.

[51] Int. Cl.⁵ .............................................. F16L 55/10
[52] U.S. Cl. ...................................... 138/89; 138/91; 220/237; 220/327
[58] Field of Search .................... 138/89, 91; 220/233, 220/234, 235, 236, 237, 315, 327

[56] References Cited

U.S. PATENT DOCUMENTS

| | | | |
|---|---|---|---|
| 437,289 | 9/1890 | Clark . | |
| 1,099,158 | 6/1914 | Baker . | |
| 2,064,569 | 12/1936 | Santucci | 220/236 |
| 2,424,449 | 7/1947 | Gasche | 220/237 X |
| 2,493,452 | 1/1950 | Grigg | 285/165 |
| 2,662,663 | 12/1953 | Schmidt et al. | 220/25 |
| 2,665,877 | 1/1954 | MacGregor | 220/235 X |
| 2,735,697 | 2/1956 | Zanin | 285/22 |
| 2,783,912 | 3/1957 | Hobbs | 220/46 |
| 2,870,794 | 1/1959 | Thaxton | 138/90 |
| 2,886,067 | 5/1959 | Maxwell et al. | 138/90 |
| 3,006,680 | 10/1961 | Gregory | 294/93 |
| 3,051,200 | 8/1962 | Bevington | 138/89 |
| 3,483,894 | 12/1969 | Finocchiaro | 138/90 |
| 3,494,504 | 2/1970 | Jackson | 220/237 |
| 3,494,504 | 2/1970 | Jackson | 220/24.5 |
| 3,765,456 | 10/1973 | Karpenko | 138/89 |
| 4,063,758 | 12/1977 | Westberg | 138/89 X |
| 4,188,675 | 2/1980 | Ast | 220/237 X |
| 4,282,982 | 8/1981 | Nuesslein | 220/237 |
| 4,282,982 | 8/1981 | Nuesslein | 220/231 |
| 4,303,101 | 12/1981 | Tholen | 138/89 |

FOREIGN PATENT DOCUMENTS

| | | | |
|---|---|---|---|
| 0145850 | 11/1979 | Japan | 220/237 |
| 145850 | 11/1979 | Japan | 220/237 |
| 166561 | 1/1934 | Switzerland | 220/237 |

Primary Examiner—James E. Bryant, III
Attorney, Agent, or Firm—Arnold, White & Durkee

[57] ABSTRACT

A weld-free all purpose seal for closed fluid systems is disclosed. This sealing device includes a ring body having a flanged top member for coupling to a pipe with a first plurality of apertures in spaced relationship therethrough. The ring body is recessed in the bottom member with a lip extending beyond the apertures. A flexible annular seal is provided having the reduced diameter from top to bottom adapted to be integral with the lip surface of the ring body. A wedge block is also provided with a planar top surface with a second plurality of apertures in spaced aligned relationship with the first plurality and continuing therethrough. The wedge block being of reduced diameter from bottom to top and adapted to receive the flexible annular seal. The wedge block may also have a diameter to interconnect with the recessed area of the ring body bottom member. Metal bolts extend through the first and second plurality of apertures drawing the ring body and wedge block into pressure engaging relationship thus completely capturing the flexible annular seal therebetween.

12 Claims, 3 Drawing Sheets

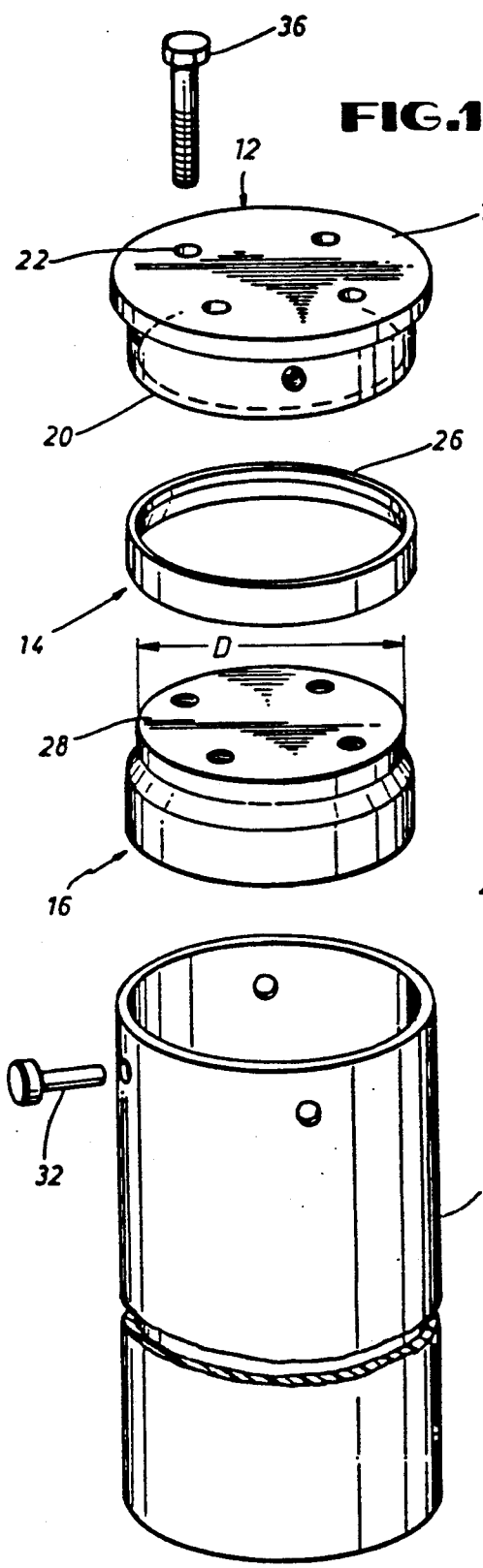
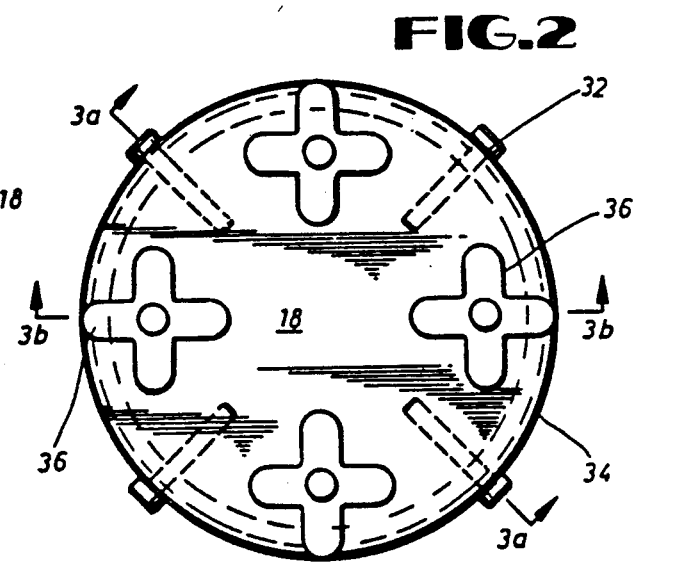
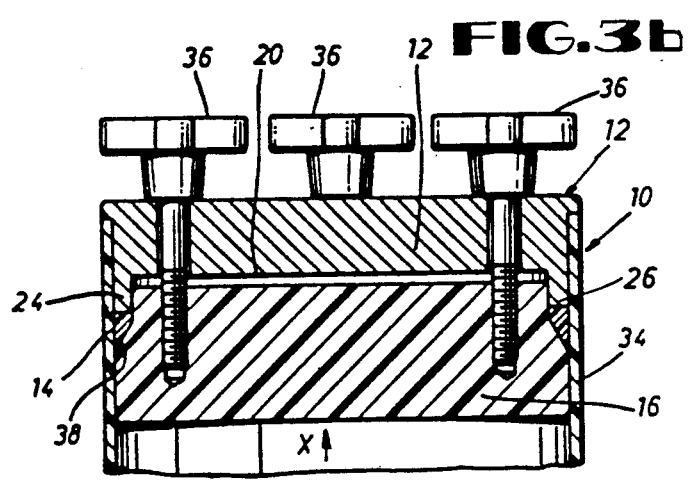
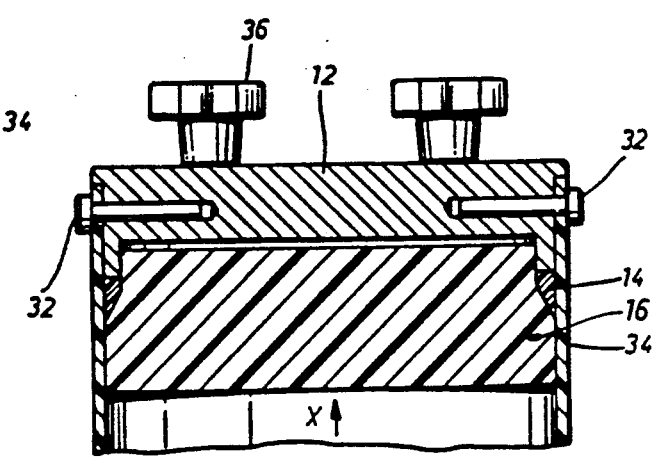

PIPE AND SEALING DEVICE

This application is a continuation of application Ser. No. 879,519, filed June 27, 1986, now abandoned, which is a continuation of application Ser. No. 734,822, filed May 16, 1985, now abandoned, which is a continuation of application Ser. No. 428,345, filed Sept. 29, 1982, now abandoned.

BACKGROUND OF THE INVENTION

This invention relates to a high pressure pipe sealing device and more specifically to an all purpose weld-free permanent seal for piping systems.

High pressure piping systems require specialty in seals to insure the integrity of the system. End seals are necessary under testing conditions for valves and other components. More permanent seal sub-assemblies are utilized for filter equipment and water treatment devices.

In the latter case the end seals are more permanent to the assembly and have the further requirement of being easily removable for access to the filter or water treater for servicing.

Test plugs or packing gland assemblies are of a wide variety and geared to temporary use, oftentimes in conjunction with additional gauge assemblies.

Permanent type end seals and some temporary end seals used welded flange assemblies. In these systems there is typically a flange welded to a pipe with a top plate or "blind flange" in conjunction with a seal and bolting arrangement to provide the total end seal arrangement. It has been found that use of a flange system in a permanent seal environment which requires accessibility is problematic in the time factor required to get inside the system. Further, it is a problem of expense in the welding process and the need of additional materials.

This need of a greater amount of materials results from the extension of the flange beyond the pipe. This extension is on each side of the pipe and for example, a 6-⅝ths diameter pipe will result in approximately an 11-inch outside diameter flange. The extension is required to enable the bolting arrangement through the flange and top plate for sealing. Also, the materials become an added expense in this system with the use of carbon steel for the flange and top plate.

SUMMARY OF THE INVENTION

The present invention overcomes the problems of the welded flange system in providing a weld-free high-pressure sealing device. Further, the materials used are less expensive and fewer in amount. The main materials are plastic and include a seal of silicon rubber, Teflon ® or other types of sealing materials with a Shure Durameter hardness of approximately 50.

In accordance with the present invention a high pressure pipe sealing device is disclosed in a weld-free environment including a ring body in conjunction with a flexible annular seal and wedge block member. The ring body in one embodiment includes a flanged top member for coupling to the pipe, and also having a first plurality of apertures in spaced relationship therethrough. The ring body is also recessed in the bottom member with a lip extending beyond the apertures.

A flexible annular seal is also provided having a reduced diameter from top to bottom. The top surface of the flexible annular seal is adapted to be integral with the bottom extending lip surface of the ring body.

A wedge block is provided with a planar top surface in one embodiment having a second plurality of apertures in spaced aligned relationship with said first plurality of apertures and continuing therethrough. The wedge block being of a reduced diameter from bottom to top and adapted to receive the flexible annular seal. In accordance with the invention the wedge block top member may have a diameter to interconnect with the recessed area of the ring body bottom member.

Means for securing the ring body to the wedge block is provided and in one embodiment may take the form of metal bolts. These metal bolts extend through the first and second plurality of apertures drawing the ring body and wedge block into pressure engaging relationship thus completely capturing the flexible annular seal therebetween.

In accordance with a second embodiment of the present invention radial pins are provided which extend into the sidewalls of the ring body for securing the pipe sealing device from vertical movement within the pipe itself.

The ring body and wedge block members also may contain central openings for fluid ingress and egress.

In accordance with an alternate embodiment of the present invention an inner cylinder ring seal assembly is provided wherein an upper and lower wedge block is utilized in conjunction with a ring body and flexible annular seals therebetween. The result is a sealing arrangement for apparatus inside the pipe requiring side entry flow of fluid.

In all embodiments contemplated radial pins may be utilized into the ring body or wedge block for inhibiting vertical movement within the pipe itself.

BRIEF DESCRIPTION OF THE DRAWINGS

Other objects and advantages of the present invention will become apparent from the detailed description of the invention that follows taken in conjunction with the drawing figures where like reference numerals represent like parts in which:

FIG. 1 is an exploded perspective view of the components of one embodiment of the present invention utilizing a blind flange;

FIG. 2 is a top view of the assembled sealing device utilizing the blind flange of FIG. 1;

FIG. 3A is a first side view of the blind flange embodiment with radial pins taken at section 3A—3A of FIG. 2;

FIG. 3B is a second side view of the blind flange embodiment with steel bolts for securing the ring body to the wedge block taken at section 3B—3B of FIG. 2;

DETAILED DESCRIPTION OF THE DRAWINGS

Figure 6:
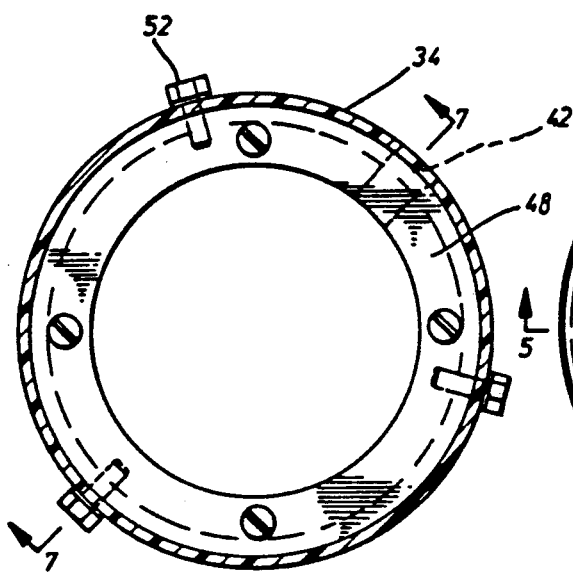
FIGS. 6 and 7 illustrate top and side views of an inner cylinder seal arrangement in accordance with the present invention.

The apparatus of the present invention includes a weld-free sealing device for use in high pressure piping systems. This device comprises three basic elements including a ring body, a flexible annular seal and a wedge block. The pressure engaging relationship of these three elements when drawn together provides a high pressure seal assembly for use in piping systems.

Referring to the drawings and more specifically to FIG. 1, an exploded view of the pipe sealing device 10 is illustrated. The three main components referenced above the ring body 12 the flexible annular seal 14 and the wedge block 16 are shown in their respective positions. The ring body 12 comprises a top member 18 and a bottom member 20. The top member 18 includes a flange and has a first plurality of apertures 22 in spaced relationship to one another extending through the ring body 12. The bottom member 20 is cupped or recessed having a lip extension 24.

The ring body 12 in one embodiment of the invention has a planar top member 18 and may be composed of either a steel or plastic material.

The flexible annular seal 14 and wedge block 16 are adapted to interconnect with each other. Thus, the flexible annular seal 14 has a reduced diameter from top to bottom and the wedge block 16 has a reduced diameter from bottom to top. The top surface 26 of the flexible annular seal 14 is adapted to be integral with the bottom surface 24 of the ring body.

The wedge block 16 is also provided with a plurality of apertures on the top surface 28. These apertures are in spaced aligned relationship with the plurality of apertures 22 in the top member 18 of the ring body 12.

The ring body 12 is provided with apertures 30 extending from the sidewalls. The apertures 30 are adapted to receive a plurality of pins 32 for retaining the assemblage of the elements of the device within a pipe 34 along its longitudinal access.

Means for securing the ring body to the wedge block 16 are provided. These means for securing may comprise metal bolts 36. The metal bolts 36 extend through the apertures 22 through the ring body 12 into the top surface 28 of the wedge block 16. Securing the bolts 36 draws the wedge block 16 to the ring body 12 thus capturing the flexible annular seal 14 therebetween. In one embodiment of the invention the diameter D of the wedge block 16 may constitute a length allowing the wedge block 16 to interconnect into the recess area of the bottom member 20 of ring body 12.

The flexible annular seal 14 may comprise a silicon rubber material or may be composed of Teflon ®, or other types of sealing materials having a Shure Durameter hardness of approximately 50. The wedge block 16 may also be of a plastic material. With the flexible annular seal 14 having a range of durameter hardness of approximately 50 the material is soft enough that when placed in the pipe 34 will flow into the rough areas of the pipe or compensate for pipes that are out-of-round.

The assembly of the device 10 does not require welding or extra materials for generating an upper flange for sealing purposes.

FIGS. 2 and 3A and 3B generally illustrate the different views of the device 10 in assembled form. The embodiment of FIG. 2 is specifically directed to a blind flange configuration. The assembly 10 in this configuration provides an end seal assembly. The securing means 36, i.e. metal bolts 36, draw the wedge block 16 into the bottom surface 20 of the ring body 12. The pressure of the fluid acting in direction X will further enhance the frictional relationship between the flexible annular seal 14 and the wedge block 16 at the surface 38. Since the ring body 12 includes a lip extension 24 from the bottom surface 20 the seal 14 is completely captured.

The side view of FIGS. 3A and B illustrate the case where the diameter of the wedge block 16 is such that the force drawing the wedge block to the ring body 12 will cause an interconnection to the bottom recess of the ring body and the wedge block top surface 28. Further, the side view 3B illustrates the radial pin connection of the bolts 32 into the ring body 12 for maintaining the assembly 10 in fixed relationship to the pipe 34.

Figure 4:
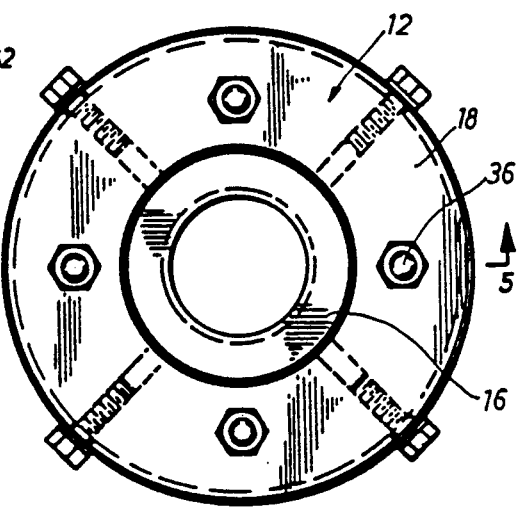
FIGS. 4 and 5 illustrate top and side views of the end seal assembly in accordance with the present invention having an output passageway adapted to receive threaded pipes.
Figure 5:
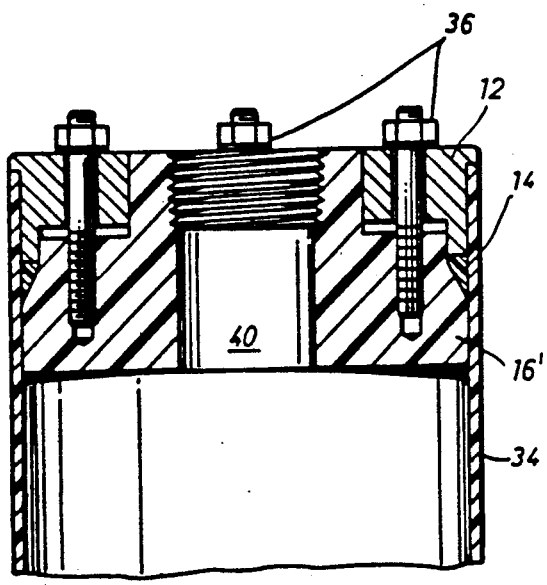

Also provided in the present invention is an end seal further adpated for receiving a threaded pipe for output of the fluid in the system. FIGS. 4 and 5 illustrate such an embodiment. In this configuration the top of the wedge block 16 is provided with a central opening 40. FIG. 5 demonstrates this opening 40 may be adapted to receive a threaded pipe (not shown). Central opening 40 thus allows any fluid in the piping system 34 to be discharged.

It is recognized that there are applications for sealing assemblies that are inside the cylinder or pipe. Thus it is not an end seal arrangement but an inner cylinder arrangement. The apparatus of the present invention contemplates such an embodiment and is illustrated as such in FIGS. 6 and 7. It is found that when an inner cylinder sealing arrangement is required a blind flange end seal is also often utilized. The blind end seal and flange may be of the type illustrated in FIGS. 2 and 3A and B. Thus the fluid that is to be pressurized in the system may be fed through the sidewall of or a gauge may be used to indicate pressure inside the piping system 34. This input feed 42 may be provided through the ring body itself.

Figure 7:
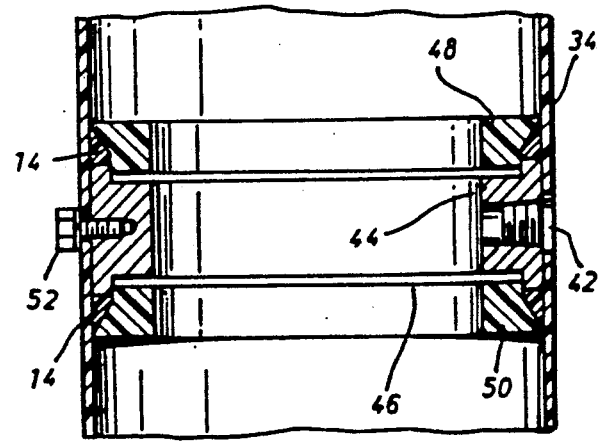

In the inner cylinder seal arrangement the ring body may entail a more complex configuration having top and bottom recessed areas for receiving upper and lower wedge blocks. The ring body 44 illustrated in FIG. 7 demonstrates the double recess area 46 interconnected with the upper wedge block 48 and the lower wedge block 50. FIG. 7 further illustrates the radial pin connector 52 attached into the ring body 44. The flexible annular seals 14 are also provided in tandem to interact between the upper wedge block 48 and the ring body 44 and the lower wedge block 50 and the ring body 44. Each flexible annular seal 14 in this configuration is also totally captured between the wedge blocks and the ring body in accordance with the present invention.

Figure 8:
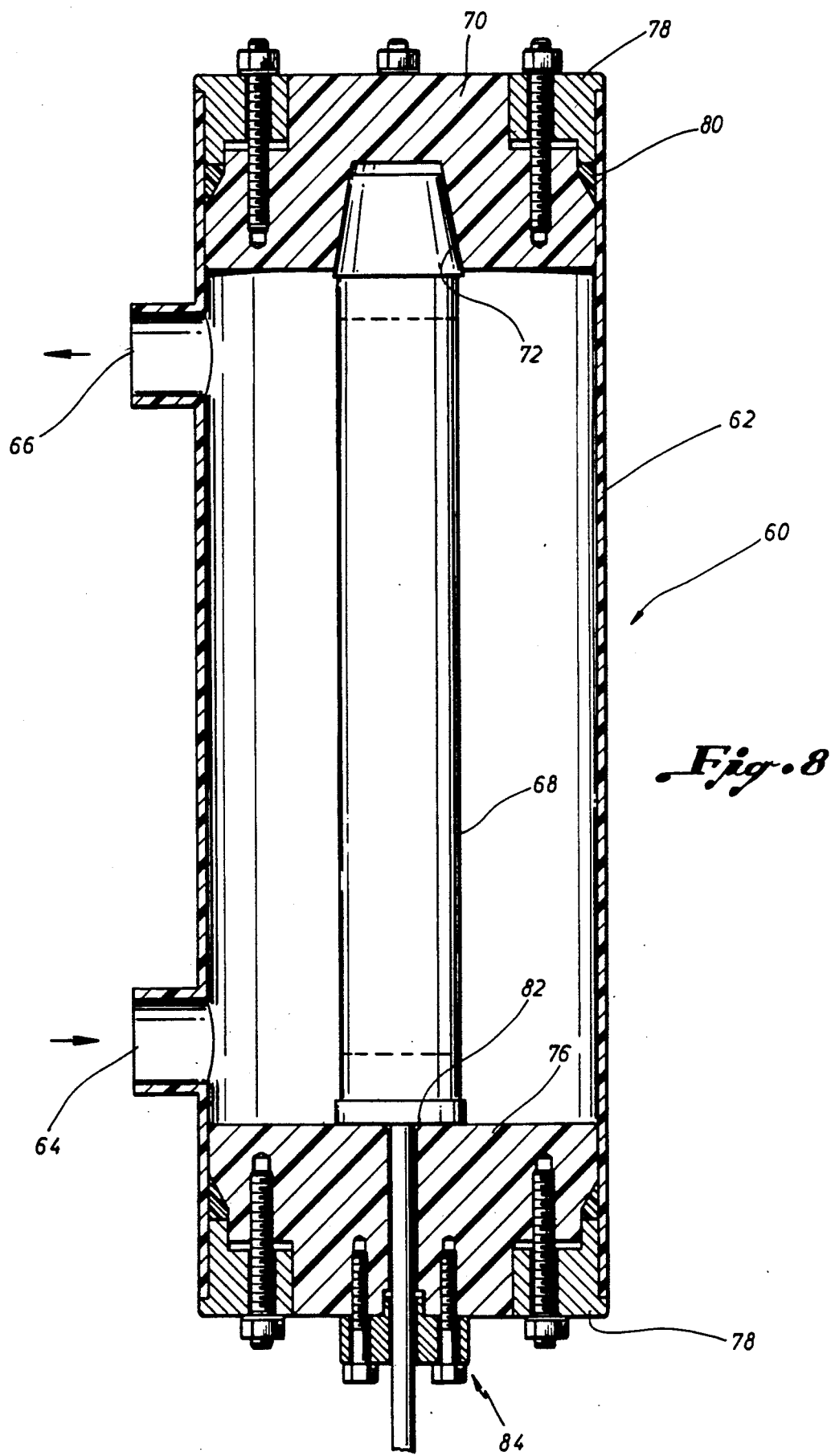
FIG. 8 is an assembly view of a water treatment apparatus utilizing a rod assembly with top and bottom end seal assemblies in accordance with the present invention.

One application of the sealing device of the present invention is illustrated in FIG. 8. The apparatus of FIG. 8 is a HYDROTREATER ® water treatment device. In this water treater apparatus 60, a pressurized system is utilized with a pipe 62 having in inlet port 64 and an outlet 66. A centralized electrode 68 is positioned within the piping system 62. The end seal assemblies in accordance with the present invention support the electrode 68. In one alternate embodiment the wedge block 70 includes a recessed area 72 or support cup, for holding the electrode 68 in a centralized position between the pipe walls 62. The opposite end seal would include a wedge block assembly 76 interfacing with a ring body 78 and flexible annular seal 80 in a manner similar to that described for the embodiments of FIGS. 2 through 7. The wedge block assembly 76 is provided with a central opening 82 for securing the opposite end of the electrode supported by the cup 70.

A collar and seal arrangement 84 is also provided to interface with the wedge block 76 to contain the fluid in the system and the integrity of the connection.

While it is understood that the invention has been described and illustrated with respect to specific embodiments those skilled in the art will recognize that further modifications may be made within the spirit and scope of the invention as described in the claims that follow. For example, the sealing device of the present invention may be utilized in the testing environment as a test plug or packing gland.

What is claimed is:

1. A sealing device for securing and sealing within the generally continuous cylindrical interior of a high pressure pipe having a plurality of apertures therethrough, comprising:

a unitary ring body having a flanged top member for coupling to said pipe, said top member having a first plurality of apertures in spaced relationship therethrough, said ring body including a bottom member with a protrusion extending beyond said apertures forming a recessed area, said ring body further including a plurality of radial apertures adapted to align with said apertures in said pipe;

a flexible annular seal having a tapered portion having a reduced diameter from top to bottom, and having a top surface adapted to be integral with said bottom member of said ring body, said tapered portion comprising a first surface concentric to said generally cylindrical surface of said pipe and a second surface angularly disposed relative to said first surface;

a wedge block with a planar top member, said wedge block having a second plurality of apertures therethrough in spaced aligned relationship with said first plurality of apertures, said block having an upper portion of reduced diameter adapted to telescopically engage said recessed area in said ring body, said block including a transitional area between said upper portion and a lower portion, said transitional area being of a reduced diameter from bottom to top and adapted to receive said flexible annular seal, said transitional area being substantially parallel to said second surface of said annular seal;

means for securing said ring body to said wedge block, said means extending through said first and second plurality of apertures, completing capturing said flexible annular seal therebetween, whereby said means for securing draws said ring body toward said wedge block to cause said annular seal to sealingly engage said cylindrical surface of said pipe; and a plurality of insertable members extending through said apertures in said pipe and into said apertures in said ring body for preventing longitudinal movement of said sealing device relative to said pipe.

2. The high pressure pipe sealing device as set forth in claim 1 wherein fluid ingress and egress is provided by an orifice extending through the center of both the annular ring and the wedge block to the inside of said pipe.

3. The high pressure pipe sealing device as set forth in claim 1 wherein said annular ring is composed of steel.

4. The high pressure pipe sealing device as set forth in claim 1 wherein said annular ring is composed of plastic.

5. The high pressure pipe sealing device as set forth in claim 1 wherein said flexible annular seal is composed of a silicon rubber material.

6. The high pressure pipe sealing device as set forth in claim 1 wherein said wedge block is composed of a plastic material.

7. The high pressure pipe sealing device as set forth in claim 1 wherein the reduced diameter of said flexible annular seal from top to bottom and the reduced diameter of said wedge block from bottom to top designates an angular relationship in the range of 15° to 30°.

8. The high pressure pipe sealing device as set forth in claim 1 wherein said means of securing said ring body to said wedge block comprises metal bolts.

9. The sealing device as set forth in claim 1, wherein said plurality of insertable fasteners comprises a plurality of radial pins extending through said pipe into the side wall of said ring body bottom member.

10. The high pressure pipe sealing device as set forth in claim 1 wherein said wedge block bottom member includes a recess cup for supporting rod like materials within the pipe.

11. The high pressure pipe sealing device as set forth in claim 1 wherein said ring body includes a central opening therethrough adapted to receive a rod like member and further including a collar and rod seal for retaining said rod like member within said central opening.

12. The high pressure pipe sealing device as set forth in claim 1 wherein said ring body and said wedge block are divided into first and second sections with said wedge block outer surface adapted to receive a threaded pipe.

* * * * *